US011645069B2

(12) United States Patent
Kalsi et al.

(10) Patent No.: US 11,645,069 B2
(45) Date of Patent: May 9, 2023

(54) SYNCHRONIZING ACCESS CONTROLS FOR AUDITED CODE DEVELOPMENT

(71) Applicant: INTERNATIONAL BUSINESS MACHINES CORPORATION, Armonk, NY (US)

(72) Inventors: Amardeep Singh Kalsi, Worcester Park (GB); Konrad Ohms, Hannover (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/412,940

(22) Filed: Aug. 26, 2021

(65) Prior Publication Data

US 2023/0063724 A1    Mar. 2, 2023

(51) Int. Cl.
  *G06F 8/70*    (2018.01)
  *G06F 8/36*    (2018.01)
  *G06F 21/62*   (2013.01)

(52) U.S. Cl.
  CPC .............. *G06F 8/70* (2013.01); *G06F 8/36* (2013.01); *G06F 21/6218* (2013.01)

(58) Field of Classification Search
  CPC ........... G06F 8/70; G06F 8/36; G06F 21/6218
  USPC ................................................. 717/105–122
  See application file for complete search history.

(56) References Cited

U.S. PATENT DOCUMENTS

| | | | |
|---|---|---|---|
| 6,851,107 B1 * | 2/2005 | Coad ........................ | G06F 8/71 717/108 |
| 6,993,759 B2 * | 1/2006 | Aptus ....................... | G06F 8/71 717/109 |
| 8,630,961 B2 * | 1/2014 | Beilby ..................... | G06N 3/004 706/11 |
| 9,612,821 B2 * | 4/2017 | Iyer ....................... | H04L 41/5054 |
| 10,228,936 B2 * | 3/2019 | Suparna ................... | G06F 8/00 |
| 10,735,522 B1 * | 8/2020 | Sathianarayanan ..... | G06F 17/18 |

(Continued)

FOREIGN PATENT DOCUMENTS

| CN | 107517124 A | 12/2017 |
|---|---|---|
| CN | 107908973 A | 4/2018 |

(Continued)

OTHER PUBLICATIONS

Li et al., "Research on Blockchain Smart Contracts Vulnerability and A Code Audit Tool based on Matching Rules", ACM, pp. 484-489 (Year: 2020).*

(Continued)

*Primary Examiner* — Anil Khatri
(74) *Attorney, Agent, or Firm* — Steven M. Bouknight

(57) ABSTRACT

Concepts for synchronising and maintaining audited code and toolchain access in a modern software development pipeline are presented. In particular, by leveraging software bots (also known as software development bots) to monitor changes in a development team's preferred access control mechanism, such changes in the preferred state can be stored as preferred/target configuration in a source controlled repository. Further, the same (or other) software bots may be used to monitor for configuration drift between the source-controlled system and the preferred/target configuration stored in the repository and eliminate drifts automatically if possible or alert interested parties about those drifts.

15 Claims, 4 Drawing Sheets

(56) References Cited

U.S. PATENT DOCUMENTS

| | | | |
|---|---|---|---|
| 10,963,242 | B2 | 3/2021 | Thomas, Jr. |
| 11,025,675 | B2* | 6/2021 | Barday .................. G06Q 10/10 |
| 11,144,289 | B1* | 10/2021 | Hwang .................. G06N 5/022 |
| 11,297,144 | B2* | 4/2022 | Sathianarayanan .. G06Q 10/103 |
| 11,301,224 | B1* | 4/2022 | Dabhi ................. G06F 11/3414 |
| 11,343,284 | B2* | 5/2022 | Barday ............... H04L 63/1433 |
| 11,425,217 | B1* | 8/2022 | Gilat ........................ H04L 41/22 |
| 11,562,267 | B2* | 1/2023 | Polleri ................... H04L 51/02 |
| 2011/0125798 | A1 | 5/2011 | Misch et al. |
| 2017/0372247 | A1 | 12/2017 | Tauber et al. |
| 2018/0191706 | A1 | 7/2018 | Hobson et al. |
| 2020/0125540 | A1 | 4/2020 | Sadashiv |
| 2021/0081819 | A1* | 3/2021 | Polleri ................... G06N 5/046 |

FOREIGN PATENT DOCUMENTS

| | | |
|---|---|---|
| CN | 111443940 A | 7/2020 |
| CN | 112650532 A | 4/2021 |

OTHER PUBLICATIONS

Wyrich et al, "Towards an Autonomous Bot for Automatic Source Code Refactoring", IEEE, pp. 24-28 (Year: 2019).*

Nadir et al., "An Auditing Framework For Vulnerability Analysis of IoT System", IEEE, pp. 39-47 (Year: 2019).*

Storey et al., "Disrupting Developer Productivity One Bot at a Time", ACM, pp. 928-931 (Year: 2016).*

Bubeck et al., "Implementing best practices for systems integration and distributed software development in service robotics—The Care-O-bot R robot family", IEEE, pp. 609-614 (Year: 2012).*

Erlenhov et al, "Current and Future Bots in Software Development", IEEE, pp. 7-11 (Year: 2019).*

Anonymous, "About Code Owners," GitHub Docs [online], [accessed on Aug. 16, 2021], 5 pages, Retrieved from the Internet: <URL: https://docs.github.com/en/free-pro-team@latest/github/creating-cloning-and-archiving-repositories/about-code-owners>.

Anonymous, "Controllers," Kubernetes [online], [accessed on Aug. 16, 2021], 4 pages, Retrieved from the Internet: <URL: https://kubernetes.io/docs/concepts/architecture/controller/>.

Anonymous, "Guide to GitOps," Weave.Works [online], [accessed on Aug. 16, 2021], 19 pages, Retrieved from the Internet: <URL: https://www.weave.works/technologies/gitops/>.

Anonymous, Owners files, Kubernetes Contributors [online], [accessed on Aug. 16, 2021], 8 pages, Retrieved from the Internet: <URL: https://www.kubernetes.dev/docs/guide/owners/>.

Dai, et al., "Re; prow," GitHub Kubernetes [online], [accessed on Aug. 16, 2021], 5 pages, Retrieved from the Internet: <URL: https://github.com/kubernetes/test-infra/blob/master/prow/README.md>.

Erik, "Configuration as Code (CAC)," Cloudbees Blog [online], Dec. 18, 2018 [accessed on Aug. 16, 2021], 6 pages. Retrieved from the Internet: <URL: https://rollout.io/blog/configuration-as-code-everything-need-know/>.

Jacabs, et al., "What is Infrastructure as Code?," Azure DevOps [online], May 12, 2012 [accessed on Aug. 16, 2021], 3 pages, Retrieved from the Internet: <URL: https://docs.microsoft.com/en-US/azure/devops/learn/what-is-infrastructure-as-code>.

Wikipedia, "Version control", Wikipedia, the free encyclopedia, [accessed on Aug. 16, 2021], 11 Pages, Retrieved from the Internet: <URL: https://en.wikipedia.org/wiki/Version_control>.

International Search Report and Written Opinion for PCT/IB2022/057497, International filing date: Aug. 11, 2022, dated Nov. 28, 2022, 10 pages.

* cited by examiner

SYNCHRONIZING ACCESS CONTROLS FOR AUDITED CODE DEVELOPMENT

BACKGROUND

The present invention relates generally to computers, and more particularly to synchronizing access controls between computing systems during software development activities.

To facilitate rapid development and release of software, software engineers typically leverage social coding techniques to: understand the code ecosystem so they can build well integrated features; learn from existing implementations so they can speed up task delivery; and/or prevent duplication of effort and minimise long term maintenance costs.

With the evolution of open-source software development communities, software development activities across teams of software engineers can create difficulties for auditing and managing accuracy of access configurations over time.

Use of open-source software development tools also opens up potential gaps in access controls that can go unnoticed and/or unchecked for long periods of time, leaving software code bases vulnerable to unauthorized modifications. For example, the use of an owners file has become popular as a means to automate a pull request process, but such mechanisms quickly become stale and out of sync (e.g. as team members move around). This can, for instance, result in an outdated list of software code reviewers/approvers, and thus potentially lead to a security access violation. Such issues are of particular relevance in large (e.g. corporate) software development environments where team compositions can change frequently.

Furthermore, it is normal for modern software development pipelines to contain multiple, loosely-coupled services and tools for performing various functions in a pipeline. Management overheads are therefore further compounded by the need to also manage access to these connected tools, often by different access control and authorization means.

Software development teams therefore must adhere to corporate and/or industry standards for secure engineering and audit controls for software code access to code and other restricted environments (including but not limited to security scan or infrastructure management portals), so as to avoid/prevent security breaches, compromised systems and exposure of sensitive information.

SUMMARY

The present invention provides a method, system, and computer program product for automatically synchronising and maintaining audited software code and toolchain access in a code development environment (e.g. a DevOps pipeline).

The present invention further seeks to provide a computer program comprising computer program code means which is adapted, when said computer program is run on a computer, to implement such a proposed method.

According to an aspect of the present invention, there is provided a system for synchronising and maintaining audited code and toolchain access in code development environments. The system comprises one or more software bots configured to monitor changes in an access control mechanism employed by a plurality of software code developers for shared development of program code and to identify a target configuration based on the monitoring results. The system also comprises a repository configured to store configuration information describing the identified target configuration.

According to another aspect of the invention, there is provided a system for shared program code development. The system comprises: a set of software bots configured to obtain, from a repository, configuration information describing a target configuration and to monitor a difference between a source-controlled program code development system and the identified target configuration.

According to yet another aspect of the invention, there is provided method for synchronising and maintaining audited code and toolchain access in code development environments. The method comprises: monitoring, with one or more software bots, changes in an access control mechanism employed by a plurality of software code developers for shared development of program code. The method also comprises identifying a target configuration based on the monitoring results. The method also comprises storing, in a repository, configuration information describing the identified target configuration. The method may be computer-implemented.

According to yet another aspect of the invention, there is provided a method for shared program code development. The method comprises obtaining, from a repository, configuration information describing a target configuration. The method also comprises monitoring, with one or more software bots, a difference between a source-controlled program code development system and the target configuration. Such a method may be computer-implemented.

According to another aspect of the invention, there is provided a computer program product for shared program code development, the computer program product comprising a computer readable storage medium having program instructions embodied therewith, the program instructions executable by a processing unit to cause the processing unit to perform a method according to a proposed embodiment.

According to another aspect of the invention, there is provided a processing system comprising at least one processor and a computer program product according to a proposed embodiment, wherein the at least one processor is adapted to execute the computer program code of said computer program product.

Concepts are proposed which may leverage software bots (i.e. a type of software agent), in response to an action (e.g. trigger) or a scheduled mode, to monitor for changes to a development team's access control mechanism of choice and to store the desired state as a target configuration in a source controlled repository. A proposed embodiment may also leverage software bots to monitor (i.e. watch) for configuration drift between the source-controlled system and repositories.

Such proposed concepts may eliminate significant manual effort associated with maintaining hundreds of repositories over time according to team member changes, thereby ensuring that authorized access is kept secure and compliant with requirements. Embodiments may be extended to also automatically synchronizing access levels to all tools and registries within a software development pipeline, thereby eliminating a need to manually keeping the various tools/registries in sync.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION

Figure 1:
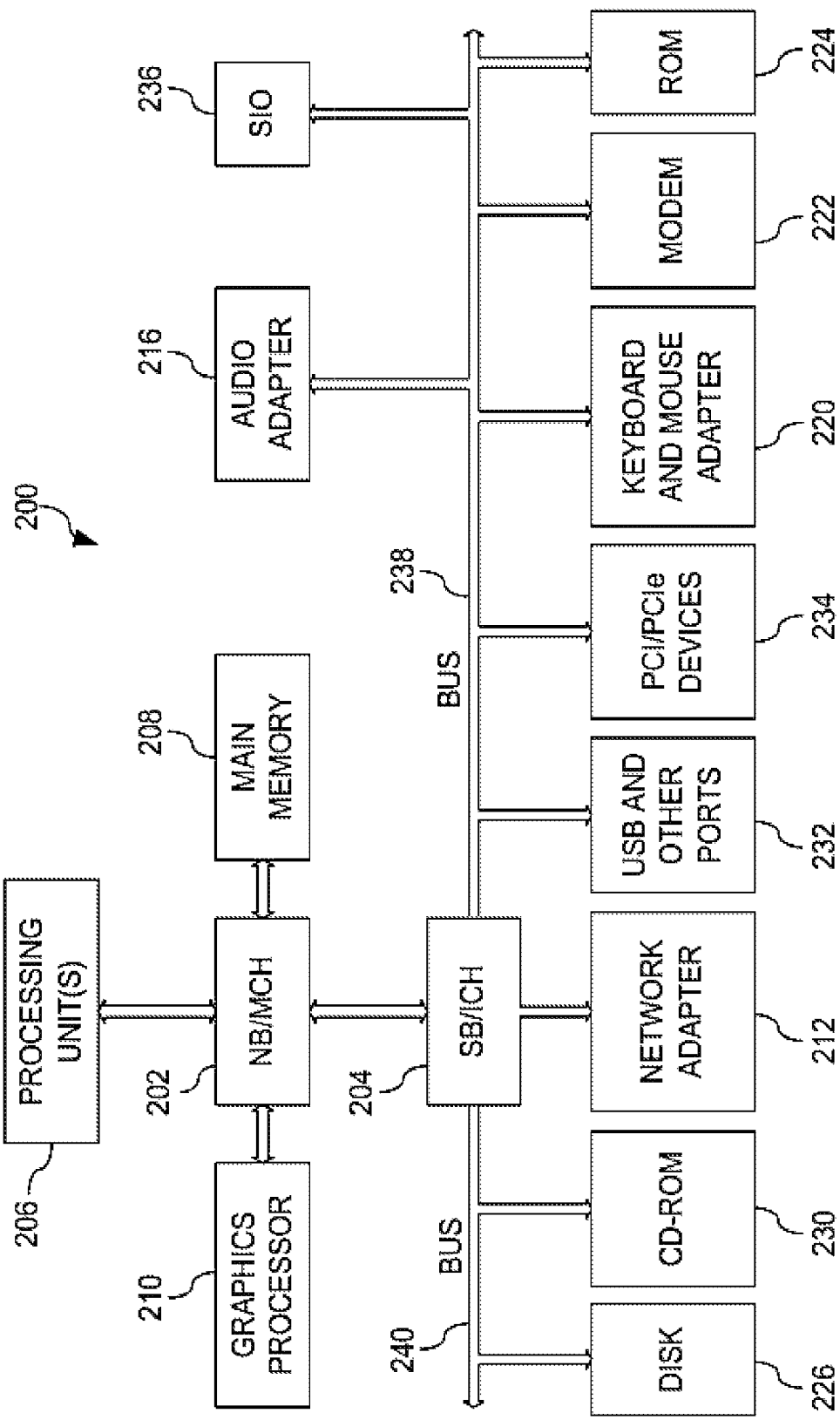
FIG. 1 is a block diagram of an example system in which aspects of the illustrative embodiments may be implemented.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. If the term "adapted to" is used in the claims or description, it is noted the term "adapted to" is intended to be equivalent to the term "configured to".

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Implementations in accordance with the present disclosure relate to various techniques, methods, schemes and/or solutions pertaining to synchronising and maintaining audited code and toolchain access in a modern software development pipeline. In particular, by leveraging software bots (also known as software development bots) to monitor changes in a development team's preferred access control mechanism, such changes in the preferred state can be stored as preferred/target configuration in a source controlled repository. Further, the same (or other) software bots may be used to monitor for configuration drift between the source-controlled system and the preferred/target configuration stored in the repository.

Embodiments may therefore significantly reduce an amount of manual effort and/or resource that would otherwise be required to keep (what could be) a large number of repositories up-to-date as changes repeatedly occur (e.g. due to team member changes). Maintaining the repositories in this way may also have the benefit of ensuring that authorised access is kept secure and compliant with predetermined (e.g. regulatory and/or corporate) requirements.

Proposed concepts may also be extended to facilitate automatic synchronisation of access levels to tools and registries within a software development pipeline (e.g. DevOps pipeline). This may eliminate a need for manual synchronisation of the various tools and registries.

Such proposals may facilitate a maintainable workflow that is tooling agnostic, thereby enabling organisations to securely and accurately keep owner details up-to-date. Furthermore, embodiments may improve on conventional software development concepts by using the same details to keep access to toolchain tools up-to-date. For example, access lists to repositories and other supporting tools may be kept up-to-date automatically.

Embodiments may therefore facilitate transparent access for all authorised members of an organisation, whilst also enabling simply/easy revocation of access (e.g. if someone moves out of the organisation).

By way of further explanation, some embodiments propose to make use of software agents (commonly referred to as 'bots'). A software agent (or 'bot') is a computer program that acts for a user or other program in a relationship of agency (i.e. an agreement to act on one's behalf). Such "action on behalf of" implies authority to decide which, if any, action is appropriate. Software agents may be embodied as software, and software agents may be autonomous or work together with other agents or users.

There are many known examples of software agents, including buyer agents (shopping bots), user agents (personal agents), data mining agents, networking and communicating agents, and software development agents (i.e. software bots). Of particular interest in relation to the proposed concepts detailed herein are software bots.

A software bot is a particular a type of software agent and serves in software project management and software engineering. Software bots often compose software services and might provide an alternative user interface, which is sometimes, but not necessarily conversational. Software bots may be used to execute tasks, suggest actions, engage in dialogue, etc. of a software project. Software bots may synchronize relevant downstream systems without any interaction with a user.

Software bots can be used to support software development activities, such as communication among software developers and/or the automation of repetitive tasks. Software bots have been adopted by several communities related to software development, including widely-known open-source communities.

It is proposed to leverage one or more software bots (in synchronous or scheduled mode) to monitor (i.e. watch for or detect) changes to a software development team's access control preference(s). Such changes in preference(s) can then be stored by the software bot(s) as a desired (i.e. preferred or target) configuration in a source controlled repository. Also, one or more software bots may be used by embodiments to monitor (i.e. watch for of detect) differences in configuration between a source-controlled system and desired configuration(s) defined in the repository.

By way of example, a proposed embodiment of a system for shared program code development comprises one or more software bots configured to monitor changes in an access control mechanism employed by a plurality of software code developers for shared development of program code and to identify a target configuration based on the monitoring results. The system also comprises a repository configured to store configuration information describing the identified target configuration.

The configuration information may, for example, comprise authorisation information describing an authorised software code developer. The authorisation information may also describe one or more access rights of the authorised software code developer.

In some embodiments, the configuration information may comprise tool information describing a toolchain tool for shared program code development. An example could be a mapping of usernames to teams available on the source code management platform. The definition could be written in any machine readable form, e.g. in YAML or JSON. It could be as simple as the following example:

- - -
teamA:
   konrad
   armardeep
teamB:
   mary
   john
   konrad

Inside the target system (e.g. code repository system, or build server), the system owners may define which team/group they want to grant which access. They would not need to manage individuals any longer, once people enter a team, they would automatically get access to the required resources as the bot would add userids to the teams on the target system automatically.

The configuration can be expressed as machine readable document which can be stored in a source code repository (e.g. as a CODEOWNERS file or an OWNERS file).

By way of example, the one or more software bots may comprise a script. For example, the first bot may comprise a simple script that is configured to read the configuration from the access management tool, write it to a file and to store it into a source code repository. A second bot could also be a script which is configured to read the target system permissions and compare them against the config file stored in the source code repository, so as to ensure that those permissions are reflected on the target system. Such scripts could be written, for example, in Bash or Node.js and could be scheduled to run periodically on a server (or by any other task runner). In a more advanced approach, bots could be implemented as permanent running processes which subscribe to events of the access management tool and to the target systems to react to changes. Thus, a software bot may comprise a periodically scheduled job executing a script interacting with APIs or a probot implementation.

The one or more software bots may be configured to write a configuration of the access control mechanism to a machine-readable file in a source code repository. Additionally, if the machine-readable file is stored in source code management systems, all authorization changes could be found in the source code management system's history which could be useful in audits.

There could be multiple other bots consuming this configuration file and translating them to the individual target systems, which could e.g. run triggered by changes in the source code repository.

A GitHub bot could use the known GitHub REST API to get all members of a team and compare them to the defined list. If there are more users in the team than defined on the file, those would get removed. If there are more users in the file defined on the team than present on the GitHub team, those users are added via the API.

The same would apply for a Jenkins bot. It would detect those changes in the file as well by using Jenkins APIs and grant the correct permission to new users while removing users which are no longer present in the file.

If certain actions are unable to proceed as expected, alerts may be sent to the belonging system administrator to raise awareness of an incompliant state on a target system. Another bot might translate the authorization information to permissions on other non-source code relevant system (e.g. a CI/CD server like Jenkins).

The system may also comprise second software bots configured to monitor a difference between a source-controlled program code development system and the identified target configuration. The second software bots may, for example, comprise at least one of the one or more software bots that are used for monitoring changes in an access control mechanism. The second software bots may drive the target system into the desired state defined in the configuration and/or notify interested parties if the drift cannot be fixed automatically.

By way of further example, the second software bots may be configured to control modification of the configuration of the source-controlled program code development system responsive to the difference meeting a predetermined requirement.

There may also be provided a system for shared program code development that comprises a set of software bots configured to obtain, from a repository, configuration information describing a target configuration and to monitor a difference between a source-controlled program code development system and the identified target configuration. The set of software bots may also be configured to control modification of the configuration of the source-controlled program code development system responsive to the difference meeting a predetermined requirement.

Embodiments may, for example, help to eliminate security loopholes and security breaches. For instance, embodiments may automatically drives changes downstream to tools outside of the source code management ecosystem.

Referring now to FIG. 1, there is presented a block diagram of an example system 200 in which aspects of the illustrative embodiments may be implemented. The system 200 is an example of a computer, such as client in a distributed processing system, in which computer usable code or instructions implementing the processes for illustrative embodiments of the present invention may be located. For instance, the system 200 may be configured to implement an interface unit, an image analysis unit, and a redaction unit according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

Figure 2:
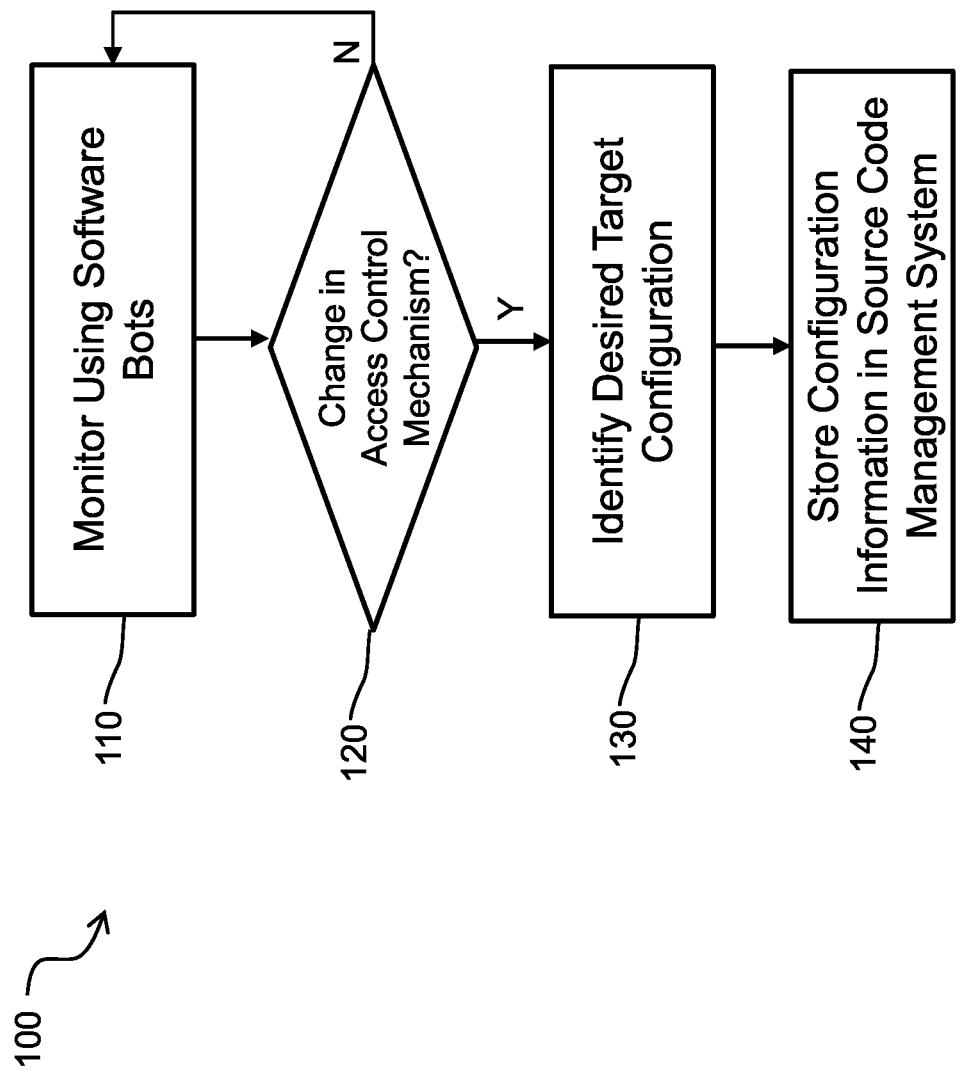
FIG. 2 is a flow diagram of a method for shared program code development, according to an exemplary embodiment.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 1, may include one or more devices used to transmit and receive data. A memory may be, for example, main memory 208, ROM 224, or a cache such as found in NB/MCH 202 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Referring now to FIG. 2, there is presented a flow diagram 100 of a computer-implemented method for shared program code development according to an exemplary embodiment.

At step 110, one or more software bots are used to monitor for changes in an access control mechanism employed by a plurality of software code developers for shared development of program code. Step 120 then comprises determining if changes in access control mechanism are detected by the monitoring (of step 110). If no changes are identified/detected, the method returns to step 110 to continue monitoring for changes.

If, in step 120, it is determined that changes in access control mechanism have been detected by the monitoring (of step 110), the method proceeds to step 130.

In step 130, a target configuration is identified based on the monitoring results (from step 110). For this, there are access management tools which can be used to manage certain approval flows or other organizational requirements. Such tools usually provide APIs to read/write authorization specific data. An example would be to query a REST API via HTTP GET calls to obtain the current state in the access management tool. By way of example, the information identified may comprise a mapping of userids to groups. Considering GitHub as example access management tool, a practical example would be the GitHub teams API. HTTP GET calls would return an identification of which users are currently part of a given team. If GitHub is the target, the same API could be used to identify the current state, and HTTP PUT calls could add new users. HTTP DELETE calls could remove a user from a given team.

Such a general approach may work with every system which offers APIs to manage user—the specific examples above are just an example of using the public GitHub API.

Once the information is extracted, it can be stored in a machine-readable format, e.g. JSON or YAML and may be processed by the bot to compare them to the state in downstream, e.g. GitHub repository access, Jenkins access, access to servers or web applications and drive changes if necessary.

The method then proceeds to step 140, wherein configuration information describing the identified target configuration is stored in a repository. In this exemplary embodiment, the configuration information comprises authorisation information describing an authorised software code developer and further describing the access right(s) of the authorised software code developer. The configuration information of this example also comprises tool information describing a toolchain tool for shared program code development.

It is to be understood that the above described embodiment is purely exemplary. Modifications (e.g. addition, removal, alteration of method steps) may be implemented to the above described embodiment may be implemented.

Figure 3:
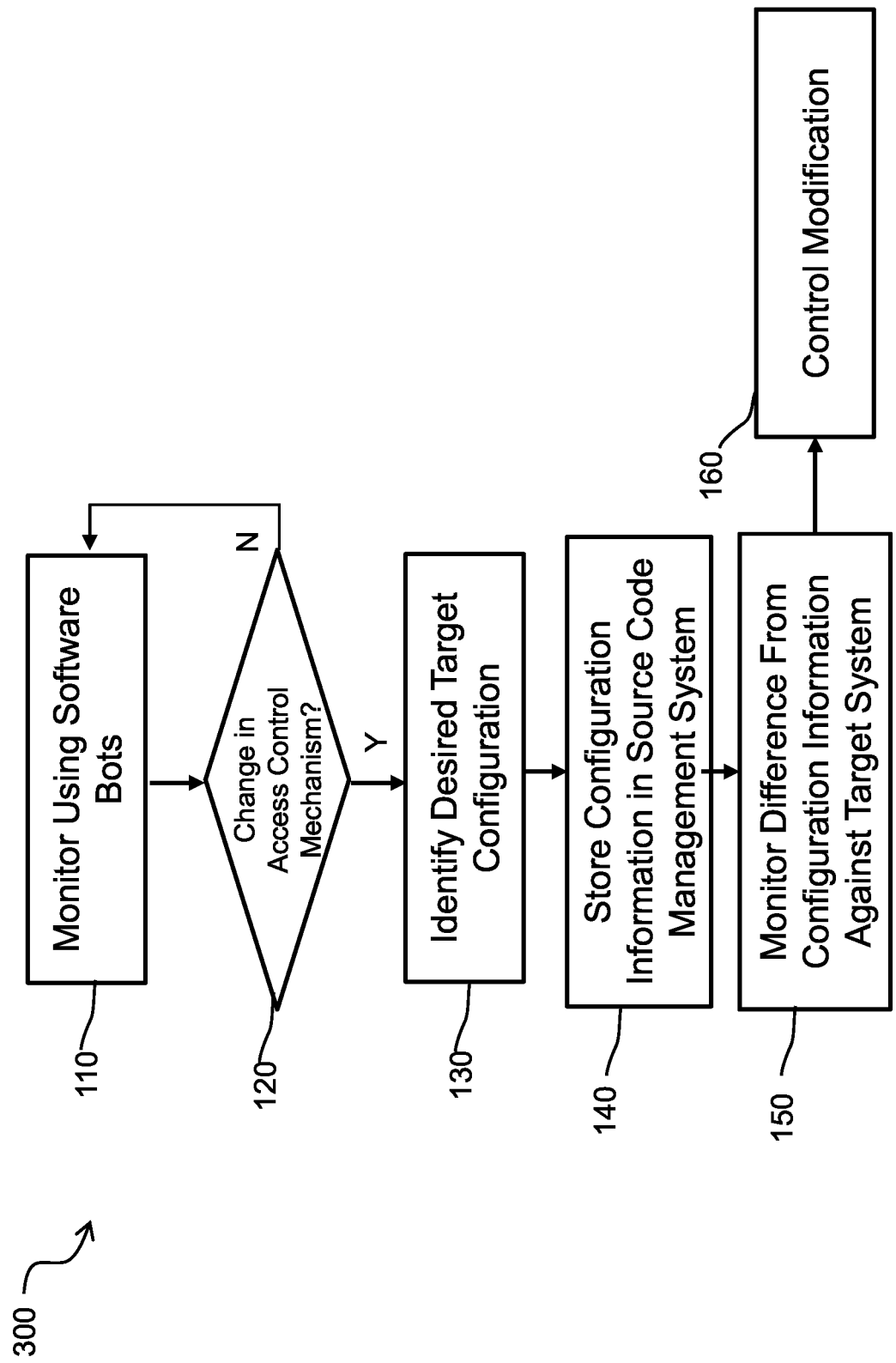
FIG. 3 is a flow diagram of modified version of the embodiment of FIG. 2.

Purely by way of example, FIG. 3 depicts a flow diagram of a modified version of the method of FIG. 2. Specifically, the method of FIG. 3 is the same as the method of FIG. 2 except that is comprises additional steps 150 and 160.

Step 150 comprises monitoring a difference between a source-controlled program code development system and the identified target configuration.

Step 160 comprises controlling modification of the configuration of the source-controlled program code development system, responsive to the difference meeting a predetermined requirement.

By way of further explanation, an exemplary implementation may be summarized in the following steps/processes:

(I) A user onboards/offboards in a company's/team's access management tool of choice. For example, this could be via AccessHub, LDAP, some other company directory or listing (BluePages, etc.).

(II) A monitoring software bot automatically detects drift between the machine-readable desired state derived from the access management tool to the permission definitions in the target system. This may be achieved either by means of: events, if the user management tools allows; or periodically queries at a pre-defined schedule and detects drifts. Such software bots may, for example, be implemented using existing/conventional tools and/or actions, such as GitHub Actions for example.

(III) Changes are committed to a central configuration repository in a machine-readable format on a protected branch. By way of example, the machine-readable format may be YAML, so as to also be human-readable (e.g. for transparency and clarity). Alternative machine-readable formats may be used, such as JSON/XML.

(IV) A software bot automatically watches for changes to membership, either synchronously via webhook events, or via scheduled pulls of data (e.g. depending on a development team's preference).

(V) The software bot monitors for differences between repositories and source-controlled repository.

(VI) The software bot commits changes to an "owners" file, via a pull request. This could be OWNERS, CODE-OWNERS or any other desired format. A translation is abstracted and maintained in bot configuration.

Such an example may also comprise the following additional steps/processes:

(VII) Software bots may be registered to also manage auto-merge of these types to avoid manual intervention if security rules allow.

(VIII) Software bots may also trigger updates to access mechanisms in associated tooling, e.g. docker registries.

It will be understood that the configuration may map team, repository and access for an organisation being managed in a platform/tool agnostic schema. This may enable the development of an ecosystem of loosely-coupled software bots to manage synchronisation. Such embodiments may further provide an ability for teams to adapt and enhance portions of the system based on specific Application Programming Interfaces (APIs) that may be required by particular tools employed by users. Systems according to proposed embodiments may thus leverage APIs and events, making it applicable to be applied to any modern DevOps toolchain.

With the access control configuration being automatically managed and synchronised, a software development team may continue to leverage GitOps/ChatOps-based workflow automation whilst continually remaining compliant with security access controls requirements.

Figure 4:
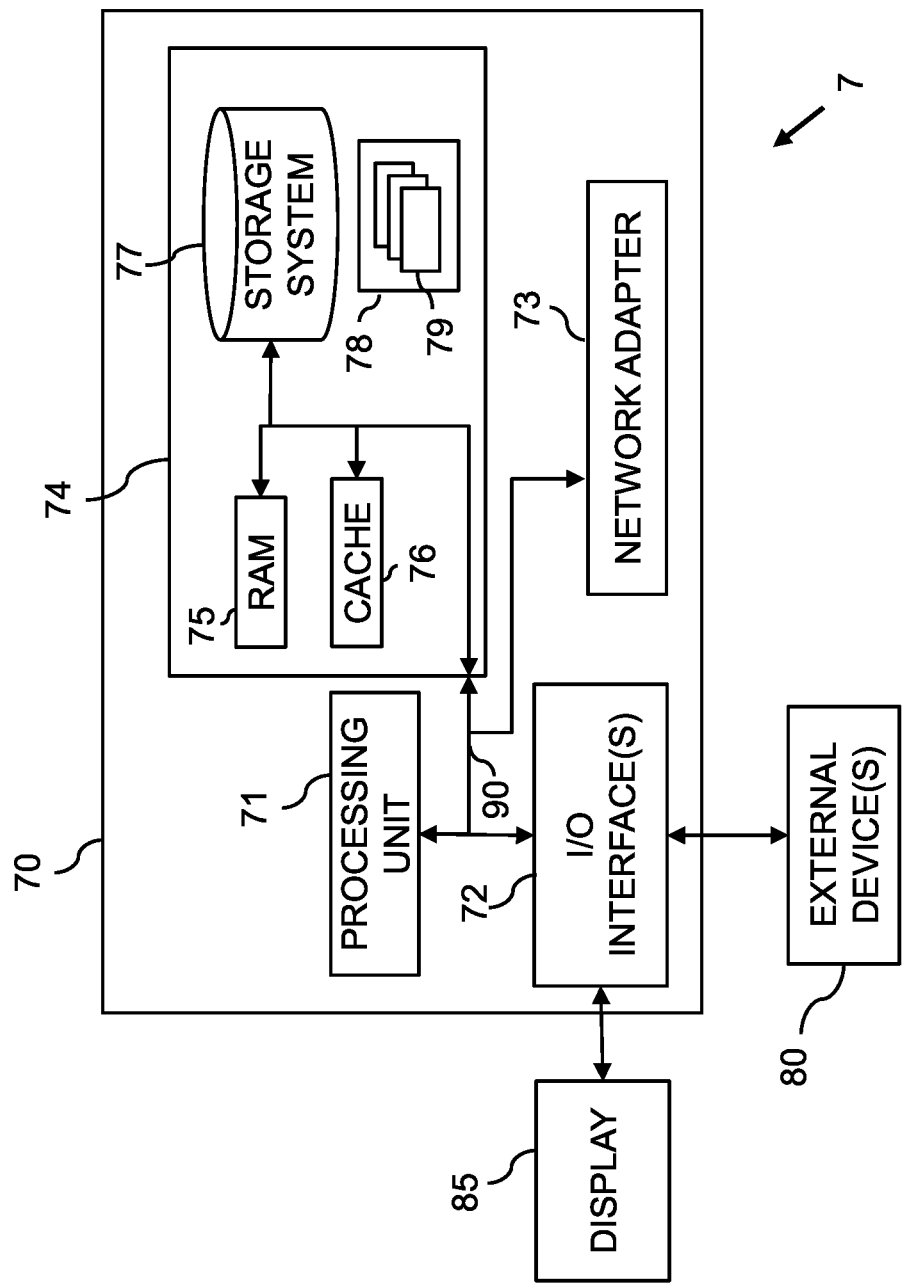
FIG. 4 is a simplified block diagram of a computer system on which the method for redacting an image may be executed.

By way of further example, as illustrated in FIG. 4, embodiments may comprise a computer system 70, which may form part of a networked system 7. For instance, a system for shared program code development may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform, a method for shared program code development according to a proposed embodiment.

Program/utility 78, having a set (at least one) of program modules 79, may be stored in memory 74. Program modules 79 generally carry out the functions and/or methodologies of proposed embodiments for detecting a scene transition in video footage.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The mere fact that certain measures are recited in mutually different dependent claims does not indicate that a combination of these measures cannot be used to advantage. Any reference signs in the claims should not be construed as limiting the scope.

What is claimed is:

1. A system for synchronizing and maintaining audited code and toolchain access in code development environments, the system comprising:
   a repository; and
   one or more software bots, the one or more software bots performing a process comprising:
      detecting whether changes occur in an access control mechanism employed by a plurality of software code developers for shared program code development;
      in response to detecting a change to the access control mechanism, identifying a target configuration based on the detected change and storing configuration information describing the identified target configuration in the repository, wherein the configuration information comprises authorisation information describing an authenticated and authorised user;

monitoring a difference between a source-controlled program code development system and the identified target configuration, wherein the monitoring further comprises obtaining the configuration information describing the identified target configuration and comparing the configuration information to target system permissions associated with at least one target system, wherein the at least one target system includes the source-controlled program code development system, and wherein the target system permissions describe group access permission to the source-controlled program code development system; and based on the comparison, automatically changing the target system permissions to reflect the configuration information.

2. The system of claim 1, wherein the authorisation information further describes one or more access rights of the authenticated and authorised user of the target system.

3. The system of claim 1 wherein the configuration information comprises tool information describing a toolchain tool for the shared program code development.

4. The system of claim 1, wherein the one or more software bots comprise a script.

5. The system of claim 1, wherein the one or more software bots write a configuration of the access control mechanism to a machine-readable file in a source code repository.

6. The system of claim 1, wherein the one or more second software bots comprise at least one of the one or more software bots.

7. The system of claim 1, wherein the one or more second software bots control modification of the configuration of the source-controlled program code development system responsive to the difference meeting a predetermined requirement.

8. The system of claim 1, further comprising:
wherein the one or more software bots obtain, from the repository, the configuration information describing the identified target configuration, and wherein the one or more software bots monitor a difference between a source-controlled program code development system and the identified target configuration.

9. The system of claim 8, wherein the one or more software bots control modification of the configuration of the source-controlled program code development system responsive to the difference meeting a predetermined requirement.

10. A computer-implemented method for synchronizing and maintaining audited code and toolchain access in code development environments, the method comprising:

detecting, using one or more software bots, whether changes occur in an access control mechanism employed by a plurality of software code developers for shared program code development;

in response to detecting a change to the access control mechanism, identifying a target configuration based on the detected change and storing configuration information describing the identified target configuration in a repository, wherein the configuration information comprises authorisation information describing an authenticated and authorised user;

monitoring, with the one or software bots, a difference between a source-controlled program code development system and the identified target configuration, wherein the monitoring further comprises obtaining the configuration information describing the identified target configuration and comparing the configuration information to target system permissions associated with at least one target system, wherein the at least one target system includes the source-controlled program code development system, and wherein the target system permissions describe group access permission to the source-controlled program code development system; and based on the comparison, automatically changing the target system permissions to reflect the configuration information.

11. The method of claim 10, wherein the authorisation information further describes one or more access rights of the authenticated and authorised user of the target system.

12. The method of claim 10 wherein the configuration information comprises tool information describing a toolchain tool for the shared program code development.

13. The method of claim 10, further comprising:
monitoring a difference between the source-controlled program code development system and the identified target configuration.

14. The method of claim 13, further comprising:
responsive to the difference meeting a predetermined requirement, controlling modification of the configuration of the source-controlled program code development system.

15. A computer program product for synchronizing and maintaining audited code and toolchain access in code development environments, the computer program product comprising a computer readable storage medium having program instructions embodied therewith, the program instructions executable by a processing unit to cause the processing unit to perform a method comprising:

detecting whether changes occur in an access control mechanism employed by a plurality of software code developers for shared program code development;

in response to detecting a change to the access control mechanism, identifying a target configuration based on the detected change and storing configuration information describing the identified target configuration in the repository, wherein the configuration information comprises authorisation information describing an authenticated and authorised user;

monitoring a difference between a source-controlled program code development system and the identified target configuration, wherein the monitoring further comprises obtaining the configuration information describing the identified target configuration and comparing the configuration information to target system permissions associated with at least one target system, wherein the at least one target system includes the source-controlled program code development system, and wherein the target system permissions describe group access permission to the source-controlled program code development system; and based on the comparison, automatically changing the target system permissions to reflect the configuration information.

\* \* \* \* \*